United States Patent
Yamamoto et al.

(10) Patent No.: US 11,755,054 B2
(45) Date of Patent: Sep. 12, 2023

(54) DRIVER ASSISTANCE SYSTEM

(71) Applicant: MAZDA MOTOR CORPORATION, Hiroshima (JP)

(72) Inventors: Yoshihiro Yamamoto, Hiroshima (JP); Yasuyuki Tonohara, Hiroshima (JP); Keiichi Yamasaki, Hiroshima (JP); Katsuhisa Maedo, Hiroshima (JP); Kazutaka Aihara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 45 days.

(21) Appl. No.: 17/614,104

(22) PCT Filed: Jun. 17, 2020

(86) PCT No.: PCT/JP2020/023822
§ 371 (c)(1),
(2) Date: Nov. 24, 2021

(87) PCT Pub. No.: WO2020/256026
PCT Pub. Date: Dec. 24, 2020

(65) Prior Publication Data
US 2022/0326726 A1  Oct. 13, 2022

(30) Foreign Application Priority Data
Jun. 18, 2019  (JP) ................. 2019-112729

(51) Int. Cl.
*G05G 1/54* (2008.04)
*B60K 26/02* (2006.01)
(Continued)

(52) U.S. Cl.
CPC ............... *G05G 1/54* (2013.01); *B60K 26/02* (2013.01); *B60T 7/08* (2013.01); *G05G 5/05* (2013.01); *G05G 9/02* (2013.01); *G05G 2505/00* (2013.01)

(58) Field of Classification Search
CPC .......... G05G 1/48; G05G 1/483; G05G 1/487; G05G 1/54; G05G 5/05; G05G 9/00;
(Continued)

(56) References Cited

U.S. PATENT DOCUMENTS 1,819,111 A * 8/1931 Neal ......................... G05G 9/00
 477/165
2,481,966 A * 9/1949 Zivi ........................ B60W 30/18
 74/532

(Continued)

FOREIGN PATENT DOCUMENTS

DE  4216805 A1 * 11/1993 ............. B60K 23/00
DE  102005046318 A1 * 3/2007 ................ B60T 7/02
(Continued)

OTHER PUBLICATIONS

International Search Report issued in PCT/JP2020/023822; dated Sep. 8, 2020.

*Primary Examiner* — Adam D Rogers
(74) *Attorney, Agent, or Firm* — Studebaker & Brackett PC

(57) ABSTRACT

A driver assistance system enables brake and accelerator operation by an operation bar in a manner close to a sense of a driver of a vehicle, regardless of the degree of operation of the operation bar. Embodiments include an operation bar extending downward toward a vehicle floor panel from a manual operation area where a seated driver manually operates the operation bar, and whose lower portion is supported in a slidingly displaceable manner along an axial direction in a front-down, rear-up tilted state. The operation (Continued)

bar includes a brake actuation section, below the manual operation area, that actuates a brake mechanism by sliding displacement of the operation bar in a front-down direction; and an accelerator actuation section that actuates an acceleration mechanism by sliding displacement of the operation bar in a rear-up direction that is a reverse direction on the same axis from the sliding displacement in the front-down direction.

9 Claims, 11 Drawing Sheets

(51) Int. Cl.
  *B60T 7/08* (2006.01)
  *G05G 5/05* (2006.01)
  *G05G 9/02* (2006.01)
(58) Field of Classification Search
  CPC ...... G05G 9/02; G05G 2505/00; B60K 26/02; B60T 7/08
  See application file for complete search history.

(56) References Cited

U.S. PATENT DOCUMENTS

| | | | | |
|---|---|---|---|---|
| 2,513,850 A * | 7/1950 | Digman | ............... | B60W 30/18 254/133 R |
| 3,226,997 A * | 1/1966 | Malloy | ................. | B60K 26/02 74/532 |
| 4,424,723 A * | 1/1984 | Gockel | ................. | B60W 30/18 403/100 |
| 4,546,667 A * | 10/1985 | Bopst, III | ................ | G05G 5/18 74/513 |
| 4,587,865 A * | 5/1986 | Winner | .................... | G05G 1/34 74/562.5 |
| 5,129,492 A * | 7/1992 | Lenz | ..................... | B60W 30/18 477/27 |
| 7,540,826 B2 * | 6/2009 | Ochiai | ................... | G05G 1/487 477/214 |
| 11,554,701 B2 * | 1/2023 | Oyama | .................. | G05G 1/025 |
| 2009/0025506 A1 * | 1/2009 | Karpachev | ............... | G05G 1/48 74/513 |
| 2010/0175497 A1 | 7/2010 | Nozu et al. | | |
| 2022/0219655 A1 * | 7/2022 | Sakuragi | ................ | B60T 7/105 |

FOREIGN PATENT DOCUMENTS

| | | | | |
|---|---|---|---|---|
| FR | 2588678 A1 * | 4/1987 | | |
| GB | 2571373 A * | 8/2019 | ............. | A61F 4/00 |
| JP | S5936518 U | 3/1984 | | |
| JP | 2006/176095 A | 7/2006 | | |
| JP | 2008/153204 A1 | 8/2010 | | |
| WO | 2004/091987 A1 | 10/2004 | | |
| WO | WO-2018047266 A1 * | 3/2018 | ............. | B60K 26/02 |

\* cited by examiner

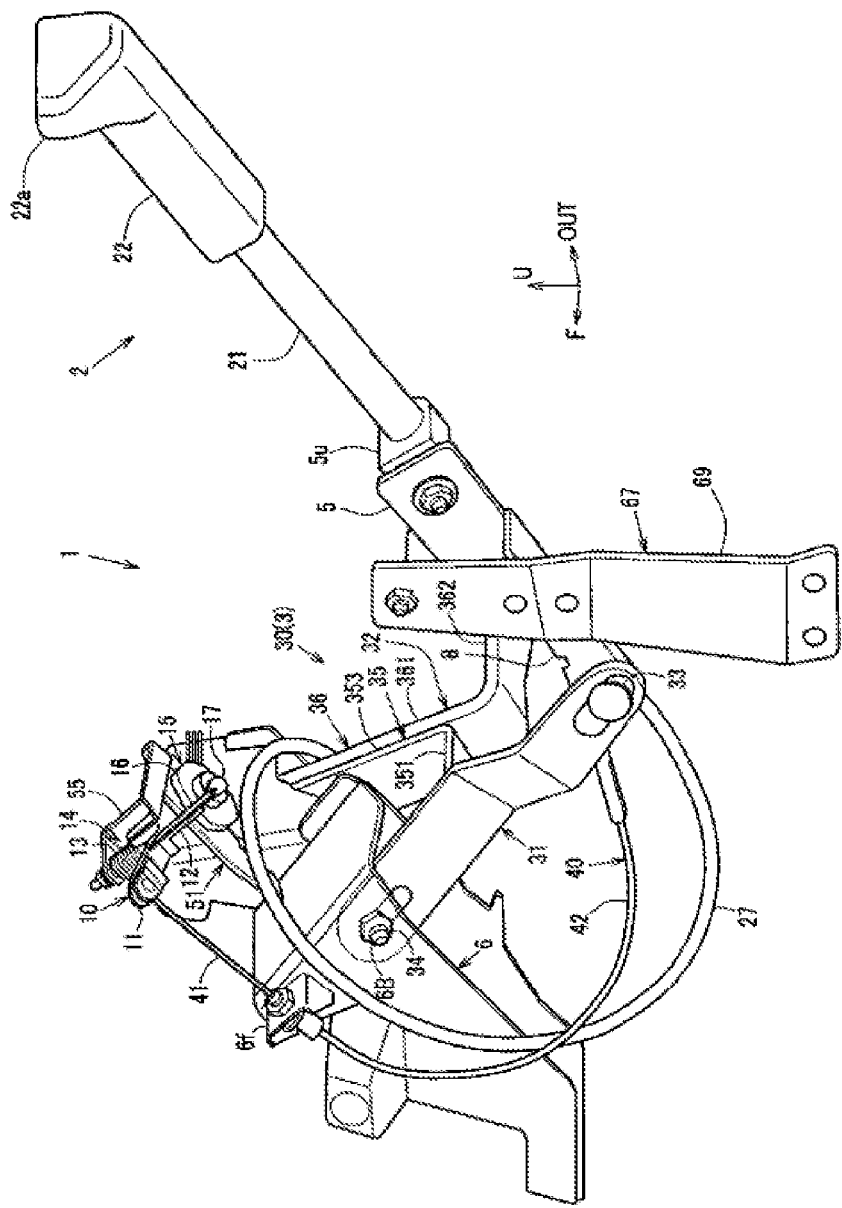

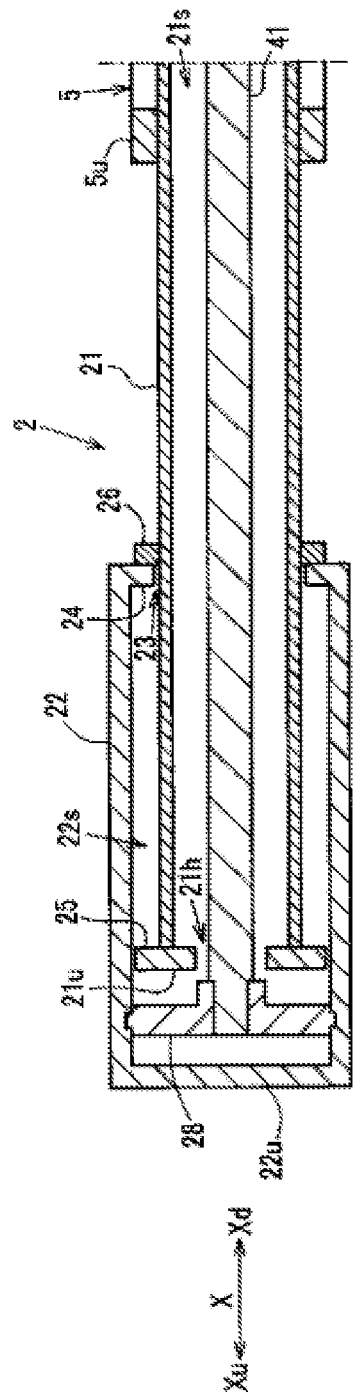

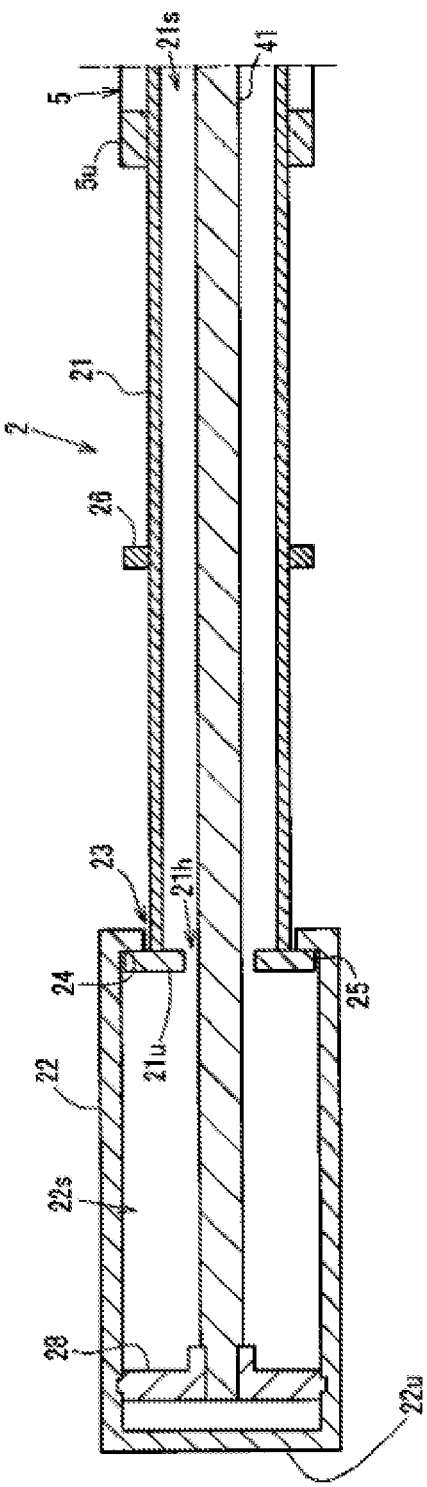

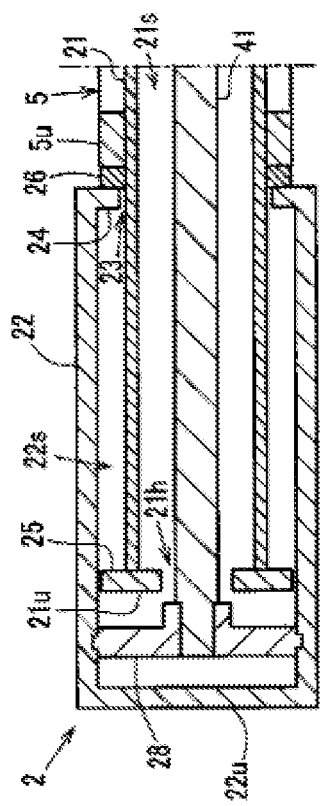

DRIVER ASSISTANCE SYSTEM

TECHNICAL FIELD

The present disclosure relates to a driver assistance system for a physically impaired person and to a driver assistance system with which a lower limb impaired person seated on a driver's seat manually performs a brake operation and an accelerator operation.

BACKGROUND ART

In order to enable a physically impaired person with a lower limb disorder (a lower limb impaired person), who has difficulty in performing depression operations of a brake pedal and an accelerator pedal by foot, to perform a brake operation and an accelerator operation by a manual operation in a seated state on a driver's seat, a driver assistance system as exemplified in each of Patent Literatures 1 and 2 has been proposed.

In a manual brake operation device as the driver assistance system disclosed in Published International Application WO2004/091987A1, a lever member (an operation lever) arranged in a tilted posture in a front-down rear-up state is further tilted rearward to rotate the brake pedal, to which a lower end portion of the lever member is joined, in a depression direction, and a brake is thereby actuated.

An automobile driving system for a physically impaired person as the driver disclosed in Japanese Patent Document JP-UM-B-59-36518 includes a brake operation lever and an accelerator operation lever as operation levers, each of which has a posture extending inward in a vehicle width direction from a steering column and is pivotally supported by the steering column. While performs the brake operation by pressing the brake operation lever forward (in a dashboard direction), the automobile driving system performs the accelerator operation by pulling the accelerator operation lever rearward (to a steering wheel side).

That is, in each of Published International Application WO2004/091987A1 and Japanese Patent Document JP-UM-B-59-36518, when a driver seated on the driver's seat holds the other end side of the operation lever with the one end side, which is pivotally supported by a vehicle body, being a fulcrum and rotates (swings) the operation lever to one side or another side of a range where the other end side can oscillate, the accelerator operation or the brake operation is appropriately performed.

However, in such a structure that the brake operation or the accelerator operation is performed by rotating the operation lever, the posture of the operation lever varies by a degree of tilting (a degree of rotation) thereof.

For example, in Published International Application WO2004/091987A1, when the lever member is tilted rearward from the posture extending in the front-down rear-up state, in an operation direction of the lever member (a displacement direction of an oscillation end of the lever member), a component displaced in a vehicle down direction gradually becomes larger than a component displaced in a vehicle rear direction as the lever member is tilted rearward.

In Japanese Patent Document JP-UM-B-59-36518, in the operation direction of the operation lever (each of the brake operation lever and the accelerator operation lever) that oscillates in a vehicle front-rear direction from a posture extending in the vehicle width direction (the displacement direction of the oscillation end of the operation lever), such a case occurs that, depending on the tilted posture during the operation of the operation lever, a component displaced in the vehicle width direction becomes larger than a component displaced in the vehicle front-rear direction.

That is, in Published International Application WO2004/091987A1 and Japanese Patent Document JP-UM-B-59-36518, in the operation direction of the operation lever for the brake operation or the accelerator operation (the displacement direction of the oscillation end of the operation lever) by the driver during travel of the vehicle, depending on a degree of the operation (the degree of tilting) of the operation lever during the operation, the displacement component in the vehicle down direction or the vehicle width direction that is not along an advancing direction of the vehicle becomes larger than a displacement component in the vehicle front-rear direction that is frequently along the advancing direction of the vehicle.

Accordingly, in such cases, the operation direction of the operation lever does not match a sense of the driver or is not easily recognized by the driver intuitively.

SUMMARY

The present disclosure has been made in view of such problems and therefore has a purpose of providing a driver assistance system that enables a manual brake operation and a manual accelerator operation in a form close to a sense of a driver who is driving a vehicle.

The present disclosure relates to a driver assistance system including an operation bar which extends in a down direction toward a floor surface near a driver's seat from a manual operation area where a driver who is seated on the driver's seat can manually operate the operation bar, and whose portion below the manual operation area is supported by a vehicle body. The operation bar has a tilted posture in a front-down rear-up state and is supported by the vehicle body in a slidingly displaceable manner along an axial direction of the operation bar and includes: in an area at least below the manual operation area, a brake actuation section that actuates a brake mechanism by the sliding displacement in a front down direction of the operation bar; and an accelerator actuation section that actuates an acceleration mechanism by sliding displacement of the operation bar in a rear up direction that is a reverse direction on the same axis from the sliding displacement in the front down direction.

A brake operation can be performed by slidingly displacing the operation bar in the front down direction, and an accelerator operation can be performed by slidingly displacing the operation bar in the rear up direction. For this reason, while the posture of the operation bar is kept constant regardless of an operation amount (a degree of an operation) of the operation bar, an operation direction thereof is set to a direction along a vehicle front-rear direction, that is, an advancing direction of the vehicle. Therefore, it is possible to keep operating the operation bar in a form close to a sense of the driver regardless of the operation amount thereof.

As an aspect of the present disclosure, the brake actuation section has a link mechanism that is interposed between the lower portion of the operation bar and a brake pedal and that transmits, to the brake pedal, an operation amount generated by the slide displacement in the front down direction.

With the above configuration, since the brake actuation section is constructed of the link mechanism as a mechanical operation amount transmission mechanism, it is possible to physically transmit the operation amount (an operation displacement amount or an operating force) to the brake pedal via the link mechanism, and it is possible to improve reliability of the brake operation by the operation bar without concern about electrical or software failure.

However, in the present disclosure, the brake actuation section is not limited to have such a configuration that the link mechanism couples the operation bar and the brake mechanism, and a by-wire system may be adopted, for example. In addition, for the accelerator actuation section, such a configuration may be adopted that mechanical means such as a link mechanism couples the operation bar and an accelerator pedal.

In an aspect of the present disclosure, the accelerator actuation section has an accelerator-by-wire mechanism that includes: a sensor that detects the operation amount by the sliding displacement in the rear up direction of the operation bar; and a wire member that transmits the sliding displacement amount in the rear up direction from the operation bar to the sensor.

Just as described, since the accelerator actuation section is constructed of the accelerator-by-wire mechanism, compared to a case where the accelerator actuation section is constructed of a mechanical operating force transmission structure that transmits the operating amount of the operation bar to the accelerator pedal via the link mechanism, for example, it is possible to keep a space around feet of the driver, who is seated on the driver's seat, as large as possible.

In an aspect of the present disclosure, the operation bar is slidingly displaceable in the front down direction or the rear up direction from a neutral position at which the operation bar is located in a state where the operating force is not applied to the operation bar. Each of the brake actuation section and the accelerator actuation section includes urging means that urges the operation bar to the neutral position.

With the above configuration, since the posture of the operation bar is not changed according to the slide displacement amount, it may be difficult to recognize the neutral position during the operation thereof. However, since the urging means urges the operation bar to the neutral position without the driver being conscious about the neutral position, it is possible to appropriately perform the accelerator operation, in which the operation bar is slidingly displaced in the front down direction from the neutral position, and the brake operation, in which the operation bar is slidingly displaced in the rear up direction from the neutral position.

In an aspect of the present disclosure, an instrument panel member as a vehicle body strengthening member extending in a vehicle width direction is disposed near and behind a dashboard that separates an engine compartment and a cabin. A floor tunnel as a vehicle body strengthening member extending in the vehicle front-rear direction is disposed in central portions in the vehicle width direction of a floor panel, which forms the vehicle body floor surface, and a dashboard. The operation bar is supported by a center stay in the slidingly displaceable manner from the driver's seat side, and the center stay is a vehicle body strengthening member that connects the instrument panel member and the floor tunnel.

With the above configuration, since the operation bar is supported by the center stay as the vehicle body strengthening member, it is possible to firmly support the operation bar to the vehicle body.

Furthermore, the center stay is the existing vehicle body strengthening member that is originally assembled to the vehicle body. Therefore, it is possible to improve assemblability of the driver assistance system to a mass-production vehicle by using such a center stay to support the operation bar to the vehicle body.

According to the present disclosure, it is possible to perform the brake operation and the accelerator operation by the operation bar in the form close to the sense of the driver who is driving the vehicle.

BRIEF DESCRIPTION OF THE DRAWINGS

FIG. 3 is an external appearance view in which the driver assistance system is seen from an inner side in a vehicle width direction and from a rear side of the vehicle.

FIG. 4A is a cross-sectional view in which an upper portion of an operation bar at a neutral position is cut along an axial direction thereof.

FIG. 4B is a cross-sectional view in which the upper portion of the operation bar at a maximum accelerating position is cut along the axial direction thereof.

FIG. 4C is a cross-sectional view in which the upper portion of the operation bar at a maximum braking position is cut along the axial direction thereof.

DETAILED DESCRIPTION

Figure 1:
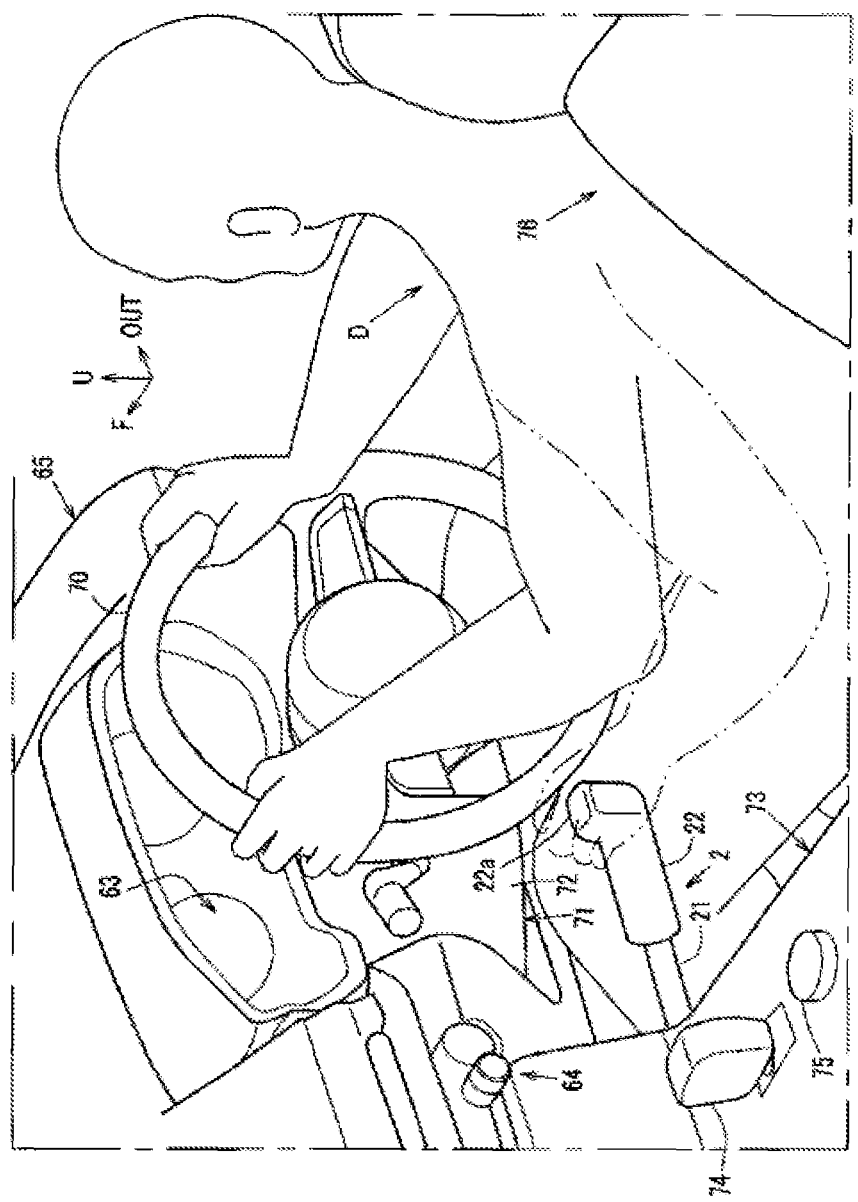
FIG. 1 is an external appearance view illustrating a situation where a vehicle including a driver assistance system in this embodiment is driven.
Figure 5:
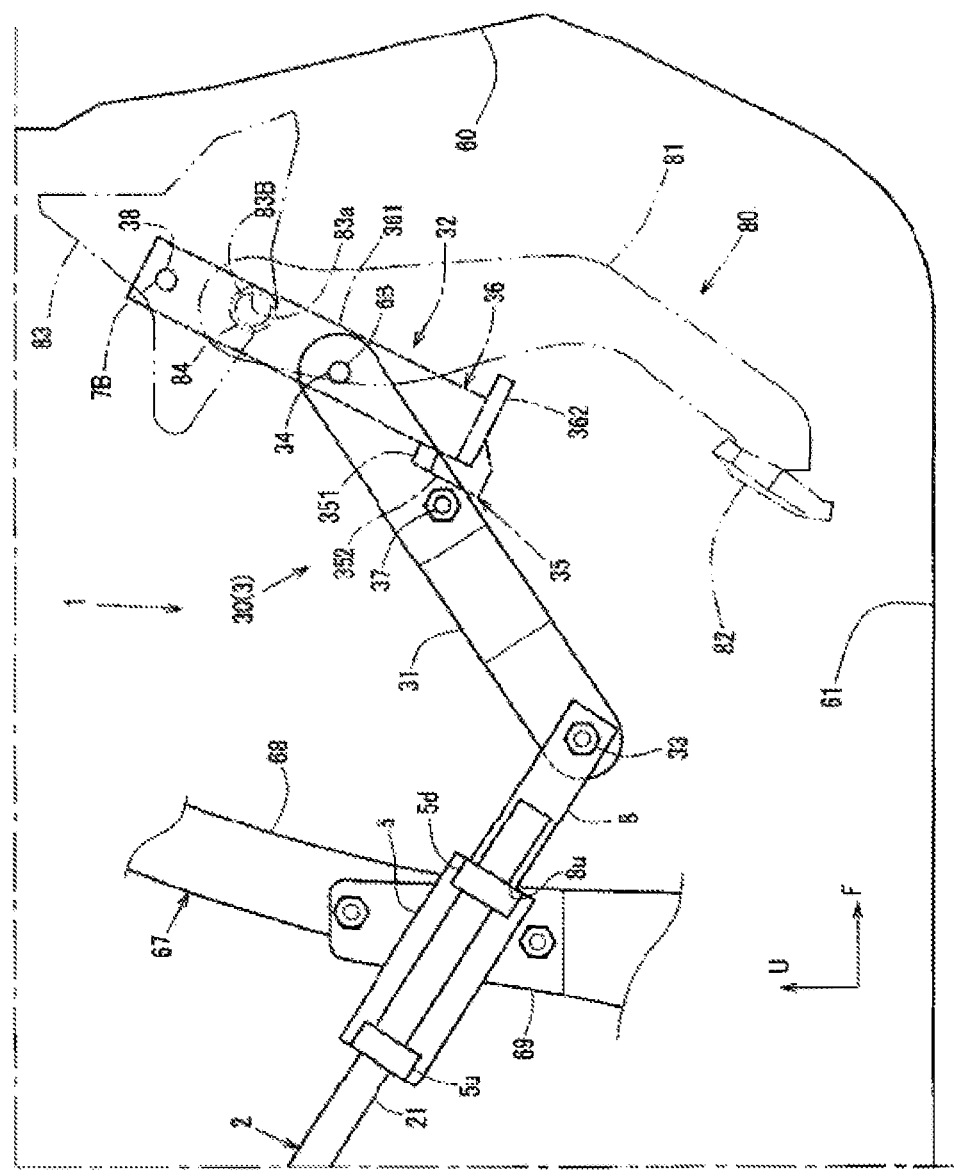
FIG. 5 is a layout explanatory view schematically illustrating a layout of the operation bar at the neutral position, a link mechanism, and a brake pedal seen from an outer side in the vehicle width direction.
Figure 6:
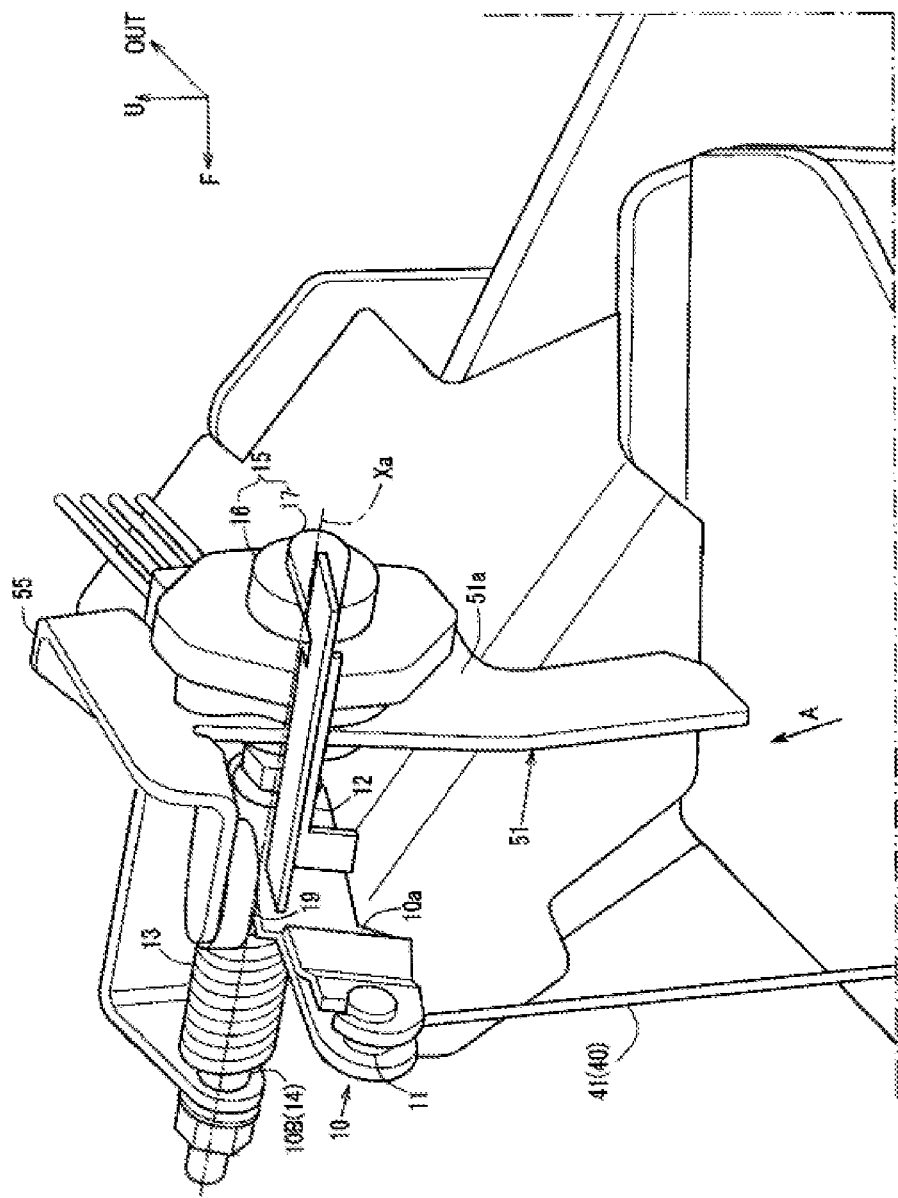
FIG. 6 is an enlarged view of a main section in which a sensor provided in an accelerator actuation section and a peripheral portion thereof are seen from the inner side in the vehicle width direction and the rear side with respect to the sensor.
Figure 7:
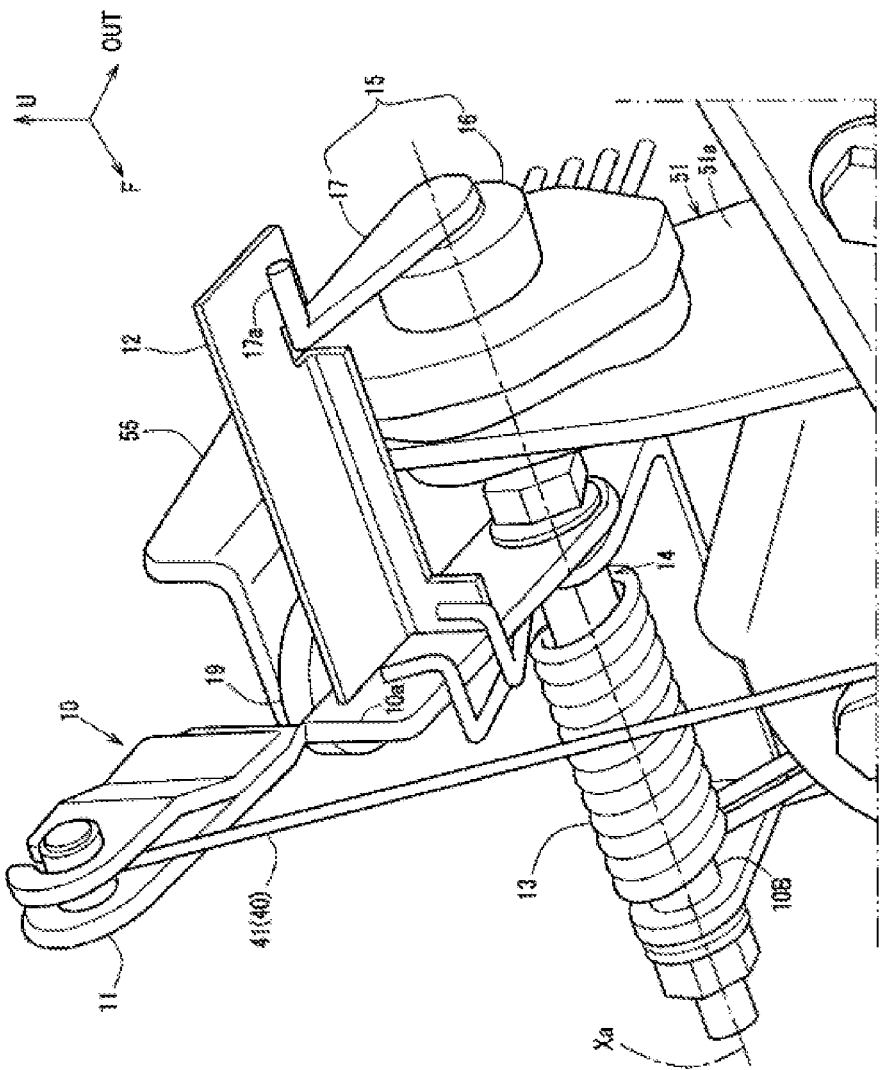
FIG. 7 is an enlarged view of the main section that is seen from an arrow A in FIG. 6.
Figure 8:
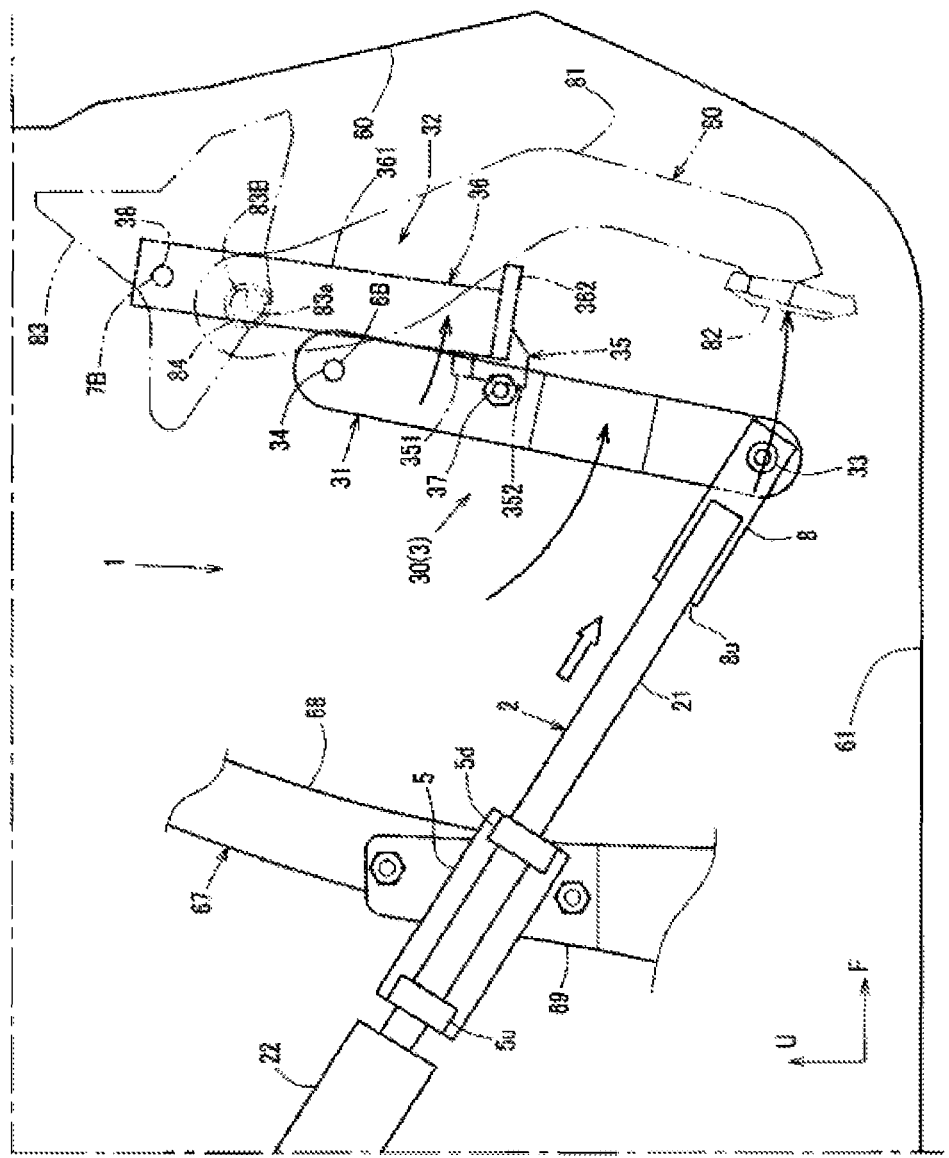
FIG. 8 is an action explanatory view illustrating a layout of the operation bar at the maximum braking position, the link mechanism, and the brake pedal on the basis of FIG. 5.

A detailed description will hereinafter be made of an embodiment of the present disclosure with reference to the drawings. FIG. 1 is an external appearance view illustrating a main structure around a driver's seat in a vehicle, to which a driver assistance system in this embodiment is assembled, and a situation where a driver drives the vehicle, FIG. 2 is a perspective view in which the driver assistance system in this embodiment, which is assembled to a base vehicle, and a periphery thereof are seen from the driver's seat side, and is a perspective view in which interior members such as an instrument panel and a center console provided in a cabin are eliminated, FIG. 3 is a perspective view in which a main structure of the driver assistance system in this embodiment is seen from an inner side in a vehicle width direction and a rear side, FIG. 4A, FIG. 4B, and FIG. 4C are schematic cross-sectional views in which an upper portion of an operation bar at a neutral position, a maximum accelerating position, and a maximum braking position is cut along an axial direction thereof, respectively, FIG. 5 is a layout explanatory view schematically illustrating a layout of the operation bar at the neutral position, a link mechanism, and a brake pedal that is seen from an outer side in the vehicle width direction, FIG. 6 is an enlarged view of a main section in which a sensor provided in an accelerator actuation section and a peripheral portion thereof are seen from the inner side in the vehicle width direction and the rear side with respect to the sensor, FIG. 7 is an enlarged view of the main section that is seen from an arrow A in FIG. 6, and FIG. 8 is an action explanatory view illustrating a layout of the operation bar at the maximum braking position, the link mechanism, and the brake pedal on the basis of FIG. 5.

In the drawings, an arrow F, an arrow U, and an arrow OUT respectively indicate a vehicle front direction, a vehicle up direction, and an outer side in the vehicle width direction (a vehicle right direction). In addition, in the following description, the outer side in the vehicle width direction (a cabin outer side) will be referred to as a "vehicle width outer side", and the inner side in the vehicle width direction (a cabin inner side) will be referred to as a "vehicle width inner side".

Figure 2:
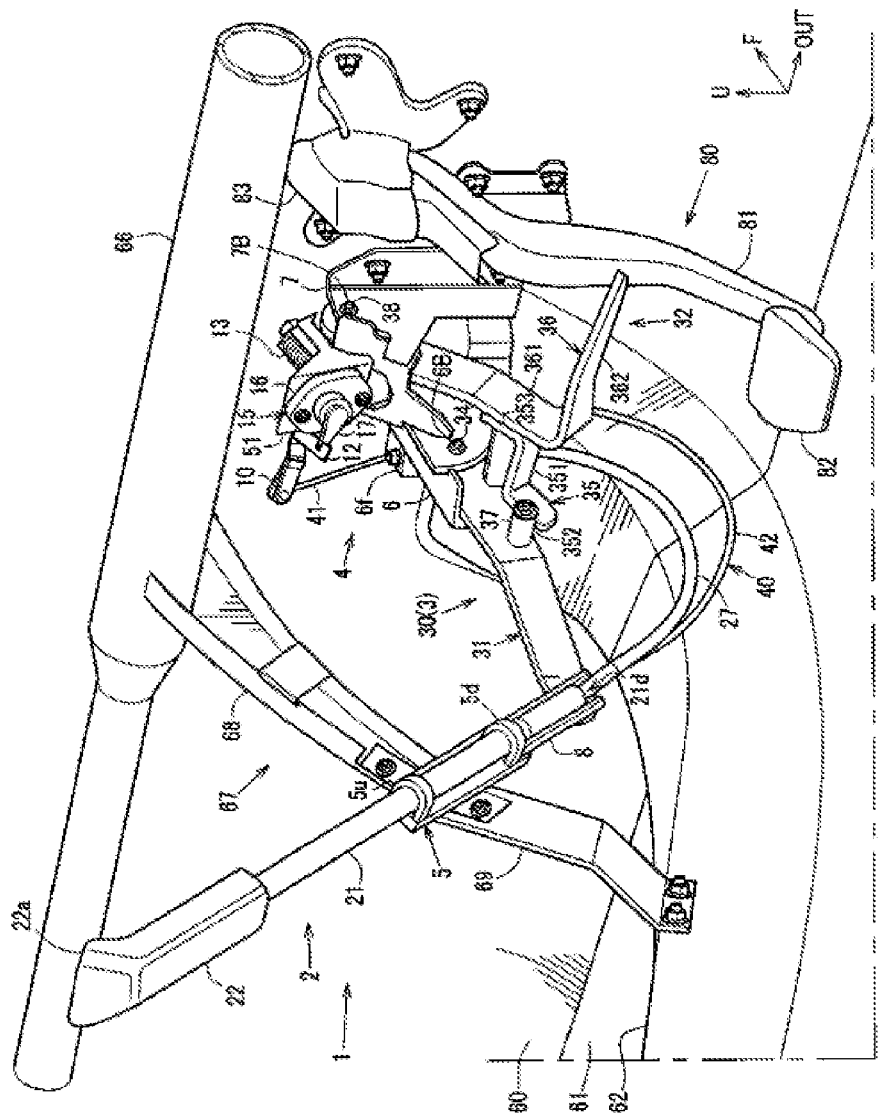
FIG. 2 is an external appearance view illustrating a state where the driver assistance system in this embodiment is assembled to a base vehicle.

As illustrated in FIG. 1, the vehicle in this embodiment is a right-hand drive vehicle and includes a driver assistance system 1 for a physically impaired person as illustrated in FIG. 2 that enables a driver D with a lower limb disorder, who has difficulty in performing depression operations of the brake pedal and an accelerator pedal by foot, to manually perform a brake operation and an accelerator operation in a seated state on the driver's seat.

The driver assistance system 1 in this embodiment is assembled to the base vehicle by modifying the base vehicle. Prior to a description on the driver assistance system 1 below, a description will be made on a schematic structure of the base vehicle.

As illustrated in FIG. 2, a front portion of the vehicle is divided into an engine compartment (not illustrated) and the cabin in a vehicle front-rear direction by a dashboard 60 in a vertical wall shape that extends in the vehicle width direction and an up-down direction.

A lower portion of the dashboard 60 extends downward and rearward, and, to a lower end portion thereof, a front end of a floor panel 61 forming a cabin floor surface is joined. In vehicle width central portions of the dashboard 60 and the floor panel 61, a floor tunnel 62 that extends in the vehicle front-rear direction is formed to be projected upward.

As illustrated in FIG. 1, on the cabin side of the dashboard 60, a display section 63 including various instruments such as a tachometer and a speedometer and an instrument panel 65, in which operation sections 64 for operating various types of in-vehicle equipment such as an air conditioner and an audio system are disposed, are provided across the entire cabin in the vehicle width direction.

The instrument panel 65 constitutes a part of an interior member of the cabin and is supported by an instrument panel member 66 (see FIG. 2) that extends in the vehicle width direction therein. The instrument panel member 66 is a vehicle body strengthening member that is formed of a steel pipe material, and is joined to a hinge pillar, which is not illustrated, as a vehicle body rigid member that extends in the up-down direction on each side of the dashboard 60.

As illustrated in FIG. 2, the instrument panel member 66 and the floor tunnel 62 are coupled by a center stay 67 as a vehicle body strengthening member. The center stay 67 is originally provided in the base vehicle and is constructed of: an upper center stay 68 that extends in a rear down direction from the instrument panel member 66; and a lower center stay 69 that extends in a front up direction from an upper portion of a right side wall surface of the floor tunnel 62.

As illustrated in FIG. 1, a driver's seat 76, on which the driver D (the driver) is seated, is mounted on an upper surface of a portion of the floor panel 61 on a front side and on a right side of a center console 73, which will be described below. A steering wheel 70 that is operated in a state of being held by the driver D is provided in front of the driver's seat 76.

As illustrated in FIG. 1, the steering wheel 70 is supported by the instrument panel member 66 (see FIG. 2) via a steering support mechanism 71. The steering support mechanism 71 includes: a steering shaft which is not illustrated and extends from a rotation center of the steering wheel 70 while being tilted forward and downward; and a steering column 72 provided to surround the steering shaft.

As illustrated in FIG. 1, the center console 73 is provided at a position above the floor tunnel 62 (see FIG. 2) and between the driver's seat 76 and a passenger's seat (not illustrated), and a front end portion thereof is connected to a central portion in the vehicle width direction of the instrument panel 65. The center console 73 constitutes a part of the interior member of the cabin and has a shift knob 74, a start switch 75, and the like disposed at such positions that the driver D seated on the driver's seat 76 can operate those by his/her left hand.

An accelerator pedal (not illustrated) and a brake pedal 80 (see FIG. 2) are provided near the floor panel 61 in front of the driver's seat 76 in the cabin. Although not illustrated, the accelerator pedal is provided at a position at which the driver D seated on the driver's seat 76 places his/her right foot. The brake pedal 80 (see FIG. 2) is provided at a position near and on a left side of (on a central side in the vehicle width direction from) the accelerator pedal.

The accelerator pedal is used to operate a throttle valve of an engine, the brake pedal 80 is used to operate a brake, and both of these are general pedals provided in the base vehicle.

As illustrated in FIG. 2, the accelerator pedal is the general pedal used to operate the throttle valve of the engine, the brake pedal 80 is the general pedal used to operate the brake, and both thereof are provided in the base vehicle.

The brake pedal 80 includes: a lever section 81 that extends in the up-down direction; and a pedal section 82 that is provided to a lower end portion of the lever section 81. An upper portion of the lever section 81 is pivotally supported by a brake pedal support bracket 83, which is attached to the vehicle body (the dashboard 60), via a shaft 83B (see FIG. 5) extending in the vehicle width direction. In this way, the brake pedal 80 is configured as a suspended type that rotates downward (forward) with a shaft support section 83*a* (see FIG. 5) in the brake pedal support bracket 83 for the brake pedal 80 being a fulcrum when the pedal section 82 is depressed.

A description will hereinafter be made of the driver assistance system 1. As illustrated in FIG. 2, the driver assistance system 1 mainly includes: an operation bar 2 that is manually operated by the driver D in a seated state on the driver's seat 76 (see FIG. 1); a brake actuation section 3 that actuates the brake by a specified operation of the operation bar 2, which will be described below; and an accelerator actuation section 4 that actuates an accelerator.

As illustrated in FIG. 1, at a position near the driver's seat 76, the operation bar 2 is provided on a left side of the steering wheel 70, that is, on the center console 73 side, and an upper portion thereof is located in a manual operation area where the driver D who is seated on the driver's seat 76 can operate the operation bar 2 by his/her left hand. The operation bar 2 extends in a front down direction from the manual operation area, that is, toward a portion of the floor panel 61 near and on the front side of the driver's seat 76.

As illustrated in FIG. 1 to FIG. 3, the operation bar 2 includes: a shaft body 21 that extends for a substantially total length in an axial direction thereof and is formed of a metal pipe material (a so-called circular pipe) having a circular perpendicular cross section to the axial direction; and a slide operation member 22 that is slidingly operated along the axial direction of the shaft body 21 by the left hand of the driver D who is seated on the driver's seat 76.

As illustrated in FIG. 4A, the slide operation member 22 is formed in a cylindrical shape having an internal space 22s, an upper end of which in the axial direction is closed while a lower end of which is opened, and externally covers an upper portion, which is located in the manual operation area, in the shaft body 21 such that the upper portion of the shaft body 21 is brought into a state of being inserted in the internal space 22s from an opening 23 at a lower front end. Here, an arrow X in FIG. 4 indicates the axial direction of the operation bar 2, an arrow Xu indicates upward in the axial direction (a rear up direction of the vehicle), and an arrow Xd indicates downward in the axial direction (the front down direction of the vehicle).

In this way, it is configured that the slide operation member 22 is slidingly displaced along the axial direction on the upper portion of the shaft body 21 and, as will be described below, in this example, the accelerator operation can be performed by sliding the slide operation member 22 in the rear up direction from a neutral position, at which the brake or the accelerator is not actuated, and the brake operation is performed by sliding the slide operation member 22 in the front down direction.

As illustrated in FIG. 1 to FIG. 3, an operation assistance projection 22a is formed in an upper end portion of the slide operation member 22, and is formed to be bent upward so that the driver D can easily press the operation bar 2 in the front down direction by a palm portion of his/her left hand or the like and can easily pull the operation bar 2 in the rear up direction (toward the driver D) by hooking his/her fingers onto the operation assistance projection 22a, or the like. Furthermore, although not illustrated, a switch group (plural switches) for controlling ON/OFF and the like of various types of the in-vehicle equipment (the air conditioner, the audio system, and the like) is disposed at a specified position on the slide operation member 22, and the driver D in the state of holding the slide operation member 22 by his/her left hand can perform a pressing operation of these switches. Moreover, as illustrated in FIG. 2 and FIG. 3, the above-described switch group and the in-vehicle equipment or the like provided on the vehicle body side are electrically connected by electrical wiring 27. The electrical wiring 27 is wired downward from the switch group side along the internal spaces 22s, 22s (see FIG. 4A) of the operation bar 2, and an extending portion of the electrical wiring 27 that extends from a lower end opening 21d (see FIG. 2) of the operation bar 2 is wired to the vehicle body side.

In FIG. 4, the operation assistance projection 22a, the switch group, and the electric wiring 27 are not illustrated.

As illustrated in FIG. 2 to FIG. 5, in a tilted posture in a front-down rear-up state, the shaft body 21 of the operation bar 2 is supported in a slidingly displaceable manner along the axial direction thereof by the center stay 67 on the vehicle body via a shaft body support bracket 5.

In FIG. 3, only the lower center stay 69 of the center stay 67 is illustrated.

The shaft body support bracket 5 is provided with slide holding sections 5u, 5d, each of which includes a bush and the like, in upper and lower end portions, respectively. The shaft body 21 of the operation bar 2 is held in the slidingly displaceable manner along the axial direction thereof by the slide holding sections 5u, 5d respectively provided on the upper and lower sides of the shaft body support bracket 5.

The shaft body support bracket 5 is fixedly attached to a right side surface of the lower center stay 69 in the center stay 67. In this way, as described above, the shaft body 21 is supported in the slidingly displaceable manner by the center stay 67 via the shaft body support bracket 5.

As illustrated in FIG. 4A, as described above, the upper portion of the shaft body 21 is inserted in the internal space 22s of the slide operation member 22 from the opening 23 on the lower front side of the slide operation member 22. At a circumferential edge of the opening 23 on the lower front side of the slide operation member 22, a projected piece 24 is formed to be projected radially inward so as to be located close to an outer circumferential surface of the shaft body 21. Thus, a tip of the projected piece 24 is projected radially inward.

Meanwhile, the shaft body 21 of the operation bar 2 is formed with an accelerator operation side stopper 25 that is projected radially outward in a flange shape from an upper rear end in the axial direction thereof. In this way, when the slide operation member 22 slides in the rear up direction along the axial direction of the shaft body 21 from a state of being located at the neutral position (see FIG. 4A) and the slide operation member 22 reaches the maximum accelerating position at which an accelerator operation amount reaches a limit value, as illustrated in FIG. 4B, the projected piece 24, which is provided at the lower front end of the slide operation member 22, abuts the accelerator operation side stopper 25, and the slide operation member 22 is thereby restricted from further sliding in the rear up direction. That is, the accelerator operation side stopper 25 cooperates with the projected piece 24 to restrict the slide operation member 22 from being detached from the upper end of the shaft body 21.

In addition, a brake operation side stopper 26 is attached to the shaft body 21 of the operation bar 2. The brake operation side stopper 26 is projected radially outward in a flange shape at a position that is separated in the front down direction from the accelerator operation side stopper 25 located at the upper rear end in the axial direction of the upper portion of the shaft body 21.

In a state where the slide operation member 22 is located at the neutral position (see FIG. 4A), this brake operation side stopper 26 abuts the projected piece 24, which is provided to the slide operation member 22, from an upper rear side of the brake operation side stopper 26. In this way, the brake operation side stopper 26 restricts the slide operation member 22 from being further displaced in the front down direction from the state at the neutral position relative to the shaft body 21.

Here, as described above, the shaft body 21 of the operation bar 2 is supported in the slidingly displaceable manner along the axial direction of the shaft body 21 on the vehicle body side, that is, by the center stay 67 via the shaft body support bracket 5. The brake operation side stopper 26 is externally provided to the shaft body 21 and is thereby integrally formed with the shaft body 21.

Accordingly, when the slide operation member 22 is further pressed in the front down direction along the axial direction of the shaft body 21 from the neutral position as illustrated in FIG. 4A (that is, the state where the projected piece 24 of the slide operation member 22 abuts the brake operation side stopper 26 from the upper rear side), as illustrated in FIG. 4C, the slide operation member 22 slides with the shaft body 21, that is, the entire operation bar 2 slides in the front down direction with respect to the shaft body support bracket 5.

In other words, it is configured that, during the brake operation of the operation bar 2, the slide operation member 22 is subjected to the pressing operation in the front down direction along the axial direction of the shaft body 21 (that is, the brake operation), and the slide operation member 22 and the shaft body 21 are thereby integrally and slidingly displaced in the front down direction.

As illustrated in FIG. 2 and FIG. 5, the brake actuation section 3 is constructed of a link mechanism 30 that is interposed between the lower portion of the operation bar 2 and the brake pedal 80 and that transmits, to the brake pedal 80, an operating force (the operation amount) generated by the slide displacement in the front down direction of the operation bar 2.

The link mechanism 30 includes a first link 31 and a second link 32 in an order from the operation bar 2 side to the brake pedal 80 side.

As illustrated in FIG. 2 and FIG. 3, the first link 31 is formed in a plate shape that extends substantially linearly and has a width in the up-down direction. An upper front side (a base side) of the first link 31 is pivotally supported by a shaft support section 34 of a first link support bracket 6 via a shaft 6B (see FIG. 5), such as a bolt, that extends horizontally in the vehicle width direction. The first link support bracket 6 is fixedly attached to the vehicle body side, that is, the dashboard 60 from a rear surface side by a bolt and the like.

Meanwhile, a lower rear side (a tip side) of the first link 31 is pivoted to a portion below the shaft body support bracket 5 in the axial direction of the shaft body 21.

More specifically, as illustrated in FIG. 2, FIG. 3, and FIG. 5, a first link pivot bracket 8 is fixedly attached to the portion below the shaft body support bracket 5 in the axial direction of the shaft body 21 in the operation bar 2 along the axial direction of the shaft body 21. The lower rear side (the tip side) of the first link 31 constitutes a pivot section 33 that is pivoted to this first link pivot bracket 8 (see FIG. 3 and FIG. 5). Here, the first link pivot bracket 8 extends along the axial direction of the shaft body 21, and a perpendicular cross section to the axial direction thereof is formed as a U-shape cross section. In regard to the first link pivot bracket 8, in the state where the operation bar 2 is located at the neutral position, an upper rear end 8u of the first link pivot bracket 8 abuts a lower front end of the shaft body support bracket 5 (the slide holding section 5d provided at a lower end of the shaft body support bracket 5) (see FIG. 5).

In this way, the first link pivot bracket 8 functions as a stopper that restricts removal of the shaft body 21 from the slide holding sections 5u, 5d, which are provided to the shaft body support bracket 5, by causing the slide operation member 22 to integrally slide with the shaft body 21 in the rear up direction at the time when the slide operation member 22 is slidingly displaced in the rear up direction from the neutral position.

In addition, as illustrated in FIG. 2 and FIG. 5, in an intermediate portion in a longitudinal direction of the first link 31, a pressing piece 37 that presses the second link 32 is formed in a boss shape and is projected substantially horizontally from a surface on the vehicle width outer side toward the vehicle width outer side.

As illustrated in FIG. 2, the second link 32 is disposed between the first link 31 and the brake pedal 80. As illustrated in FIG. 2 and FIG. 5, the second link 32 is pivotally supported by a shaft support section 38 of a second link support bracket 7 (see FIG. 2) via a shaft 7B (see FIG. 5), such as a bolt, that extends horizontally in the vehicle width direction.

As illustrated in FIG. 2, the second link support bracket 7 on the vehicle width outer side is adjacent to the first link support bracket 6, that is, is fixedly attached to the dashboard 60 from a rear surface side by a bolt and the like.

As illustrated in FIG. 2, FIG. 3, and FIG. 5, the second link 32 includes a crank-shaped member 35 and an L-shaped member 36.

The crank-shaped member 35 is formed in a crank shape by including: a body section 351 that extends in the vehicle width direction; a pressed piece 352 (see FIG. 2 and FIG. 5) that extends in the rear down direction from a vehicle width inner end of the body section 351 and is pressed by the pressing piece 37 of the first link 31; and a joint piece 353 (see FIG. 2 and FIG. 3) that extends in the front up direction from a vehicle width outer end of the body section 351 and is joined to the L-shaped member 36.

As illustrated in FIG. 2, the L-shaped member 36 is formed in an L-shape by including: a body section 361; and a pedal pressing piece 362 that extends to the vehicle width outer side from a lower rear end of the body section 361 and presses the brake pedal 80.

As illustrated in FIG. 2 and FIG. 3, in the second link 32, a vehicle width outer surface of the joint piece 353 in the crank-shaped member 35 is joined to a vehicle width inner surface of the body section 361 in the L-shaped member 36 by welding or the like, and the crank-shaped member 35 and the L-shaped member 36 are thereby integrated.

As illustrated in FIG. 2 and FIG. 5, the second link 32 is arranged such that in an area near and above the lever section 81, the pedal pressing piece 362 crosses the lever section 81 of the brake pedal 80 when the operation bar 2 is located at the neutral position.

Then, when the driver D manually performs the brake operation, as illustrated in FIG. 4C and FIG. 8, the slide operation member 22 is slidingly displaced in the front down direction from the neutral position (that is, is pressed in the front down direction).

In this way, the slide operation member 22 slides in the front down direction integrally with the shaft body 21. Accordingly, the operating force of the slide operation member 22 can be transmitted to the link mechanism 30. Furthermore, since the first and second links 31, 32, which are provided in the link mechanism 30, interlock with each other. Accordingly, the operating force (a pressing force of the slide operation member 22) can be transmitted to the brake pedal 80.

More specifically, as illustrated in FIG. 8, when the operation bar 2 is pressed down in the front down direction, the first link 31 receives the operating force of the operation bar 2 from the pivot section 33 as a point of effort with the operation bar 2. In this way, the first link 31 rotates downward with the shaft support section 34 of the first link support bracket 6 (see FIG. 2) being a fulcrum, and the pressing piece 37 as a point of application presses the second link 32 downward.

Furthermore, in the second link 32, the pressed piece 352 as a point of effort receives the operating force from the first link 31, that is, the pressing piece 37 of the first link 31 presses the pressed piece 352 of the second link 32 downward. In this way, the second link 32 rotates downward with the shaft support section 38 of the second link support bracket 7 (see FIG. 2) being a fulcrum, and the pedal pressing piece 362 as a point of application presses the brake pedal 80 downward.

As a result, the brake pedal 80 can rotate in a depression direction, that is, downward (forward). Thus, the brake can be actuated according to a slide amount in the front down direction of the slide operation member 22.

When the slide operation member 22 slides in the front down direction from the neutral position as illustrated in FIG. 4A, as described above, the shaft body 21 slides in the front down direction integrally with the slide operation member 22. Then, when the slide operation member 22 reaches the maximum braking position, at which a brake operation amount becomes a limit value, (see FIG. 4C) integrally with the shaft body 21, the brake operation side stopper 26, which is provided to the shaft body 21, abuts the vehicle body side, that is, an upper front end of the shaft body support bracket 5 (the slide holding section 5u provided at an upper end of the shaft body support bracket 5). In this way, it is set that further sliding of the operation bar 2 (the shaft body 21 and the slide operation member 22) in the front down direction is restricted.

In addition, as illustrated in FIG. 5, the shaft support section 83a for the brake pedal 80 in the brake pedal support bracket 83 includes a coil spring 84 as urging means along the shaft 83B of the shaft support section 83a. This coil spring 84 urges the brake pedal 80, which is depressed to rotate downward, to the neutral position of the brake pedal 80, and is provided in the base vehicle.

Accordingly, it is configured that, when the depression in the front down direction of the slide operation member 22 from the neutral position by the driver D is cancelled, due to an urging force of the coil spring 84, the brake pedal 80 returns to the neutral position and, in conjunction therewith, the first and second links 31, 32 and the operation bar 2 also return to the neutral positions.

More specifically, by using the urging force of the coil spring 84, which is provided in the shaft support section 83a for the brake pedal 80 in the brake pedal support bracket 83, the brake pedal 80 presses the pedal pressing piece 362 of the second link 32 upward from the lower side thereof. Furthermore, in conjunction therewith, the pressed piece 352 of the second link 32 presses the pressing piece 37 of the first link 31 upward from the lower side thereof. Moreover, in conjunction therewith, the first link 31 slidingly displaces the operation bar 2, that is, the slide operation member 22 and the shaft body 21 integrally in the rear up direction.

As illustrated in FIG. 2, the accelerator actuation section 4 includes: a lever 10 that oscillates according to the operating force (the pressing force) slidingly displacing the slide operation member 22 in the rear up direction; a sensor 15 that detects an oscillation angle of the lever 10; and an operating force transmission cable 40 that transmits the operating force from the slide operation member 22 side to the sensor 15 side by using a tensile force.

The accelerator actuation section 4 adopts an accelerator-by-wire mechanism that allows an ECU to execute control for opening the throttle valve, which is mechanically separated from the operation bar 2, in the engine on the basis of the oscillation angle of the lever 10 detected by the sensor 15.

The operating force transmission cable 40 includes: a wire 41 that is hung between the slide operation member 22 provided to the operation bar 2 and the lever 10 provided on the sensor 15 side; and a cover tube 42 that covers an intermediate portion of the wire 41.

The sensor 15 includes a sensor body section 16 and an oscillator 17 that oscillates with respect to the sensor body section 16, and an oscillation angle of the oscillator 17 is detected by the sensor body section 16.

In addition, as illustrated in FIG. 2, a sensor attachment bracket 51, to which the sensor 15 is attached, is provided right above the first link support bracket 6. A lever support bracket 55 (see FIG. 3) that supports the lever 10 in a manner to allow oscillation thereof is provided on a front side (the dashboard 60 side) of the sensor attachment bracket 51. Each of these brackets 51, 55 is fixedly fastened to the dashboard 60 from a rear surface side thereof (not illustrated).

As illustrated in FIG. 6 and FIG. 7, in the sensor 15, the sensor body section 16 is attached from a rear surface side thereof to a front wall portion 51a of the sensor attachment bracket 51 such that a tip of the oscillator 17 is projected to the vehicle width inner side and the tip thereof can oscillate in the up-down direction.

The lever 10 is formed in a plate shape that has a width in the up-down direction, extends substantially linearly, and has a step section 10a in an intermediate portion in a longitudinal direction thereof. The lever 10 is provided immediately in front of the oscillator 17 (on the dashboard 60 side), and one end (a vehicle width outer end) in the longitudinal direction of the lever 10 is pivoted to the lever support bracket 55 via a shaft 10B, such as a bolt, that extends substantially in the vehicle front-rear direction. Here, in the lever support bracket 55, the shaft 10B (that is, an oscillation center of the lever 10), which is provided on a shaft support section 14 pivotally supporting the lever 10, and an oscillation center of the oscillator 17 in the sensor 15 are formed coaxially (see Xa in FIG. 6 and FIG. 7).

As illustrated in FIG. 6 and FIG. 7, an end portion on the sensor 15 side in an extending direction of the wire 41, which is provided in the operating force transmission cable 40, is locked to an oscillating end 11 (a vehicle width inner end) of the lever 10.

As illustrated in FIG. 2, a sensor-side wire attachment flange 6f that holds an intermediate portion in an extending direction of the operating force transmission cable 40 is arranged below an oscillation range in the up-down direction of the oscillating end 11 of the lever 10. The sensor-side wire attachment flange 6f is provided to the first link support bracket 6.

An end portion on the sensor 15 side in an extending direction of the cover tube 42, which is provided to the operating force transmission cable 40, is supported by the sensor-side wire attachment flange 6f. That is, a portion between the oscillating end 11 of the lever 10 and the sensor-side wire attachment flange 6f in the wire 41 of the operating force transmission cable 40 is not covered by the cover tube 42.

Then, between these 11, 61, the wire 41 slides upward from an end portion on the sensor 15 side of the cover tube 42 (that is, extends to an outer side of the cover tube 42) or slides downward (that is, retracts to an inner side of the cover tube 42) in response to the oscillation in the up-down direction of the oscillating end 11 of the lever 10. In this way, the wire 41 is maintained in a stretched state in the up-down direction.

In addition, as illustrated in FIG. 2, FIG. 6, and FIG. 7, an intermediate portion in the longitudinal direction of the lever 10 includes a pressing piece 12 that is integrally formed on a rear surface of the lever 10 by welding or the like. The pressing piece 12 extends horizontally and rearward from the rear surface of the lever 10 to a position near and above a pressed piece 17a (see FIG. 7) that is formed at a tip of the oscillator 17 in the sensor 15. In this way, it is configured that the pressing piece 12 provided to the lever 10 presses the pressed piece 17a of the oscillator 17 downward in conjunction with downward movement of the lever 10.

In the lever support bracket 55, the shaft support section 14, which pivotally supports the lever 10, includes a coil spring 13 as urging means along the shaft 10B provided to the shaft support section 14. By this coil spring 13, the oscillating end 11 of the lever 10 is urged upward with the shaft support section 14 of the lever support bracket 55 being a fulcrum. Meanwhile, the pressed piece 17a of the oscillator 17 is also urged upward by a coil spring, which is not illustrated, as urging means provided in the sensor 15.

In this way, as described above, the lever 10 and the oscillator 17 of the sensor 15 coaxially oscillate in a substantially synchronized state, that is, with the same oscillation center.

Furthermore, as illustrated in FIG. 6 and FIG. 7, a cushioning member 19 is attached to the lever support bracket 55 in a manner to face the oscillating end 11 of the lever 10 from the above within a movable range of the lever 10. The cushioning member 19 abuts the oscillating end 11, which is urged upward by the urging force of the coil spring 13 in the state where the operation bar 2 is located at the neutral position, in the lever 10 so as to restrict further upward movement of the oscillating end 11.

As illustrated in FIG. 4A, only the wire 41 of the operating force transmission cable 40 is inserted in an internal space 21s of the pipe-shaped shaft body 21 from a lower end opening 21d (see FIG. 2) of the shaft body 21. That is, as illustrated in FIG. 2 and FIG. 3, the cover tube 42 is provided in a portion between the lower end (21d) of the operation bar 2 and the sensor-side wire attachment flange 6f and, in the portion therebetween, covers the wire 41 in a slidingly displaceable manner in the extending direction.

Here, as illustrated in FIG. 4A, the internal space 22s of the slide operation member 22 includes a locking member 28 that locks an end portion of the wire 41 that is wired to a position near the upper rear end of the operation bar 2 (the slide operation member 22).

In the internal space 22s of the slide operation member 22, the locking member 28 is fitted to an inner circumferential wall portion near an upper wall 22u, or the like and is thereby integrally fixed to the slide operation member 22.

In front view of an upper wall 21u of the shaft body 21 in the operation bar 2, a through hole 21h is formed along the axial direction in a central portion, and has such an inner diameter that permits the insertion of the wire 41 and the electrical wiring 27 for the switch group (see FIG. 2 and FIG. 3 (not illustrated in FIG. 4)).

The wire 41, which is inserted from the lower end opening 21d of the pipe-shaped shaft body 21, is wired to the upper wall 21u of the shaft body 21 along the axial direction in the internal space 21s. Furthermore, as illustrated in FIG. 4A, the wire 41 extends from the through hole 21h, which is formed in the upper wall 21u of the shaft body 21, to an outer side of the internal space 21s, and an end portion of the extending portion (that is, an end portion on the operation bar 2 side of the wire 41) is locked by the locking member 28 in the internal space 22s of the slide operation member 22.

When the above-described slide operation member 22 is subjected to a slide operation (a pulling operation) in the rear up direction from the neutral position as illustrated in FIG. 4A, as illustrated in FIG. 4B, the slide operation member 22 slides in the rear up direction from the shaft body 21, and the wire 41 is pulled in the rear up direction via the locking member 28, which is integrally formed with the slide operation member 22.

In this way, the operating force (a pulling force) thereof can be transmitted to the oscillator 17 of the sensor 15 via the wire 41 and the lever 10.

Accordingly, when the slide operation member 22 is subjected to the slide operation (the pulling operation) in the rear up direction from the neutral position, an intake amount of the engine can be increased according to the operation amount thereof. As a result, an engine output speed is increased, and the vehicle can be accelerated.

Here, as described above, the first link pivot bracket 8, which is fixed to the lower portion of the operation bar 2, is set such that, when the operation bar 2 is located at the neutral position, the upper rear end 8u thereof abuts the lower front end of the shaft body support bracket 5 (see FIG. 5). Accordingly, the further slide displacement of the shaft body 21 in the rear up direction from the neutral position with respect to the center stay 67, that is, the vehicle body is restricted.

In this way, when the slide operation member 22 slides in the rear up direction along the axial direction of the shaft body 21 from the neutral position, the slide operation member 22 does not slide in the rear up direction integrally with the shaft body 21, and only the slide operation member 22 slides in the rear up direction relative to the shaft body 21. Thus, the driver D can perform the accelerator operation by smooth pulling.

Although not illustrated, the driver assistance system 1 may include a cover that covers at least a part of the driver assistance system 1, such as the lower portion of the operation bar 2, the operating force transmission cable 40, and the link mechanism 30. By providing a cover that covers at least the part of the driver assistance system 1, it is possible to improve appearance around the driver's seat 76 in the vehicle in the state of being assembled with the driver assistance system 1.

As illustrated in FIG. 1 and FIG. 2, the driver assistance system 1 in this embodiment includes the operation bar 2 that extends in the down direction toward the floor panel 61 as a floor surface near the driver's seat 76 from the area where the driver D seated on the driver's seat 76 can manually operate the operation bar 2 (the manual operation area), and the portion of which below the manual operation area is supported by the vehicle body. The operation bar 2 is supported in the tilted posture in the front-down rear-up state by the vehicle body in the slidingly displaceable manner along the axial direction of the operation bar 2. As illustrated in FIG. 2, the driver assistance system 1 includes, at least below the manual operation area (in other words, on the floor panel 61 near the operation bar 2 and the driver's seat 76): the brake actuation section 3 that actuates a brake mechanism by the slide displacement in the front down direction of the operation bar 2; and the accelerator actuation section 4 that actuates an acceleration mechanism by the slide displacement of the operation bar 2 in the rear up direction, which is a reverse direction on the same axis from the slide displacement in the front down direction.

With the above configuration, when the driver D manually perform the brake operation, the brake operation can be performed by the operation of slidingly displacing the operation bar 2 in the front down direction, that is, a pressing operation of the operation bar 2 straight to the bottom. For example, when the driver D performs the slide operation in the front down direction of the operation bar 2 for the brake operation during forward travel of the vehicle, an inertia force that attempts to displace the driver D to the front is applied to the driver D due to the actuation of the brake. Accordingly, the operation bar 2 can easily be pressed in the front down direction by using this inertia force, and thus the operating force can efficiently be transmitted to the operation bar 2.

Meanwhile, when the driver D manually performs the accelerator operation, the accelerator operation can be performed by the slide displacement in the rear up direction of the operation bar 2, that is, the pulling operation thereof straight toward the driver D.

Here, in general, a direction that substantially matches an imaginary straight line connecting a hand and a shoulder of a human is a direction in which a pulling force at the time of pulling an object held by the hand toward himself/herself can easily be exerted. Accordingly, the accelerator operation can easily be performed by adopting the configuration that the operation bar 2 is slidingly operated in the rear up direction that substantially matches an imaginary straight line connecting the hand and the shoulder on the side where the driver D holds the operation bar 2.

More specifically, for example, in the case where the accelerator operation and the brake operation are each performed by a swing operation (the oscillation) like the conventional operation lever, due to a fact that the operation end (the oscillating end) of the operation lever draws an arcuate trajectory, depending on an attachment posture of the operation lever to the vehicle body or a degree of tilting thereof during the operation, there is a case where the operation lever is once forcibly moved in the vehicle width direction or moved in such a trajectory to lift the operation lever in a direction that does not match the straight imaginary line connecting the hand holding the operation lever and the shoulder, for example, when the operation lever is displaced forward/rearward. Accordingly, it is concerned that direct transmission of the operating force by the driver D to the operation lever becomes difficult depending on the oscillating position of the operation lever.

To handle such a problem, in this embodiment, as described above, the accelerator operation and the brake operation are performed by slidingly displacing the operation bar 2 along the axial direction thereof. Accordingly, the operation bar 2 is not operated by the driver D in the manner to be displaced while making a detour in the vehicle width direction, the up-down direction, or the like, and the operation bar 2 can keep the posture constant regardless of the operation amount thereof.

As a result, the operating force can efficiently be transmitted to the operation bar 2. Therefore, the manual operation by the operation bar 2 can easily be performed.

As described above, such a configuration is adopted that the operation bar 2 is supported in the tilted posture in the front-down rear-up state (the posture along the vehicle front-rear direction) by the vehicle body so as to enable the accelerator operation or the brake operation when being slidingly displaced in the axial direction thereof. Accordingly, in each of the accelerator operation and the brake operation, the operation bar 2 can be operated in the direction along the vehicle front-rear direction, which tends to be an advancing direction of the vehicle, during the travel of the vehicle. In addition, since the operation bar 2 is operated by the slide operation, the operation direction thereof is not changed during the operation. Therefore, each of the accelerator operation and the brake operation can be performed in the form close to a sense of the driver D during the travel of the vehicle.

In particular, in such a configuration the brake actuation section 3 actuates the brake mechanism by the slide displacement in the front down direction of the operation bar 2. Accordingly, the operation direction of the operation bar 2 during the brake operation can substantially match the direction in which the inertia force is applied to the driver D at the time of the brake operation during the forward travel of the vehicle (the vehicle front direction) or the depression direction of the brake pedal 80. Therefore, the brake operation can be performed in the form close to the sense of the driver D during the travel of the vehicle.

In addition, with the above configuration, a limitation on an installment space of the operation bar 2 in the base vehicle is less likely to be imposed. Thus, a degree of freedom of assemblability to mass-production vehicles can be increased.

In detail, as described above, for example, in the case where it is configured to perform each of the accelerator operation and the brake operation by the swing operation (the oscillation) of the operation lever, due to the displacement of the operation lever in the vehicle width direction and/or the front-rear direction, the operation lever has to be installed such that the movable range thereof does not interfere with the vehicle body and the driver D.

For example, in the case where the operation lever is provided on a door side of the driver's seat 76, such necessity arises that interference of the movable range of the operation lever with the door, the steering wheel, a direction indicator lever, which is projected to the vehicle width outer side from the steering column 72, and the like has to be considered. Meanwhile, in the case where the operation lever is provided on the center console 73 side of the driver's seat 76, such necessity arises that interference with the center console 73, the driver's seat 76 (including the driver D), and the like in the vehicle width direction and interference with the instrument panel 65 and the driver's seat 76 in the vehicle front-rear direction have to be considered.

More specifically, when the lower end of the operation lever is pivotally supported by the floor surface near the driver's seat 76, the slide amount to the front of the driver's seat 76 is limited in order to secure the oscillation range of the operation lever.

To handle such a problem, in this embodiment, as described above, the operation bar 2 can keep the posture constant regardless of a degree of the operation thereof. Therefore, the limitation of the installation space of the operation bar 2 and the like is less likely to be imposed, and the degree of freedom of the assemblability to the mass-production vehicles can be increased.

In an aspect of the present disclosure, as illustrated in FIG. 2, FIG. 3, FIGS. 4A, C, FIG. 5, and FIG. 8, the brake actuation section 3 is constructed of the link mechanism 30 that is interposed between the lower portion of the operation bar 2 and the brake pedal 80 and that transmits, to the brake pedal 80, the operation amount generated by the slide displacement in the front down direction.

With the above configuration, since the brake actuation section 3 is constructed of the link mechanism 30 as a mechanical operation amount transmission mechanism, it is possible to physically transmit the operation amount (an operation displacement amount, the operating force) of the operation bar 2 to the brake pedal 80 via the link mechanism 30. As a result, an electrical or software defect does not occur. Therefore, the brake operation can reliably be performed by the operation bar 2.

In an aspect of the present disclosure, as illustrated in FIG. 2, FIG. 3, FIGS. 4A, B, FIG. 6, and FIG. 7, the accelerator actuation section 4 is constructed of the accelerator-by-wire mechanism including: the sensor 15 that detects the operation amount by the slide displacement in the rear up direction of the operation bar 2; and the wire 41 that transmits the slide displacement amount in the rear up direction from the operation bar 2 to the sensor 15 side.

In this embodiment, since the brake actuation section 3 is constructed of the link mechanism 30, it is possible to improve reliability of the brake operation by the operation bar 2 in a mechanical operation amount transmission method. Meanwhile, since the accelerator actuation section 4 is constructed of the accelerator-by-wire mechanism, it is possible to keep a space around the feet of the driver D, who is seated on the driver's seat 76, as large as possible.

In detail, the accelerator pedal and the brake pedal 80 are respectively disposed on the right side (that is, the door side in the right-hand drive vehicle) and the left side (that is, the vehicle width inner side of the accelerator pedal in the right-hand drive vehicle) in the space around the feet of the driver D provided on the front side of the driver's seat 76.

That is, the brake pedal 80 is disposed at a closer position to the operation bar 2, which is disposed on the center console 73 side (the center side in the vehicle width direction) near the driver's seat 76, than the accelerator pedal.

Accordingly, in this embodiment, in regard to the brake actuation section 3, the operation bar 2 and the brake pedal 80, which is disposed at the position relatively close to the operation bar 2, are mechanically coupled to each other via the link mechanism 30. Thus, while suppressing enlargement of the link mechanism 30, it is possible to improve the reliability of the brake operation by the operation bar 2 in the mechanical operation amount transmission method.

Meanwhile, the operation bar 2 is not mechanically coupled to the accelerator pedal that is relatively separated from the operation bar 2 in the vehicle width direction, and an accelerator-by-wire method is adopted for the accelerator actuation section 4. In this way, it is possible to keep the space around the feet of the driver D, who is seated on the driver's seat 76, as large as possible.

As it has been described so far, it is possible to keep the space around the feet of the driver D, who is seated on the driver's seat 76, as large as possible while improving the reliability of the brake operation by the operation bar 2.

In an aspect of the present disclosure, as illustrated in FIGS. 4A, B, and C, the operation bar 2 is slidingly displaced in the front down direction or the rear up direction from the neutral position, at which the operation bar 2 in a state where the operating force is not applied to the operation bar 2. As illustrated in FIG. 5 and FIG. 8, the brake actuation section 3 includes the coil spring 84 as the urging means that urges the operation bar 2 to the neutral position from the position at which the operation bar 2 is slidingly displaced in the front down direction. As illustrated in FIG. 2, FIG. 3, FIG. 6, and FIG. 7, the accelerator actuation section 4 includes the coil spring 13 as the urging means that urges the operation bar 2 to the neutral position from the position at which the operation bar 2 is slidingly displaced in the rear up direction.

With the above configuration, since the operation bar 2 is slidingly displaced along the axial direction thereof, the tilted posture thereof in the front-down rear-up state is not changed regardless of the slide displacement amount from the neutral position. Thus, it is difficult for the driver D to recognize the neutral position of the operation bar 2, that is, the slide displacement amount of the operation bar 2 during the operation.

To handle such a problem, as in this embodiment, the brake actuation section 3 and the accelerator actuation section 4 respectively include the coil springs 84, 13 as the urging means, each of which urges the operation bar 2 to the neutral position. In this way, in the state where the operating force is not applied to the operation bar 2, the operation bar 2, which has been slidingly displaced along the axial direction, can return to the neutral position even when the driver D is not aware of the neutral position. Therefore, it is possible to appropriately perform the brake operation, in which the operation bar 2 is slidingly displaced in the front down direction from the neutral position, and the accelerator operation, in which the operation bar 2 is slidingly displaced in the rear up direction therefrom.

In an aspect of the present disclosure, as illustrated in FIG. 2, the instrument panel member 66 as the vehicle body strengthening member extending in the vehicle width direction is disposed near and behind the dashboard 60 that separates the engine compartment and the cabin. The floor tunnel 62 as the vehicle body strengthening member extending in the vehicle front-rear direction is disposed in the central portions in the vehicle width direction of the floor panel 61, which forms the vehicle body floor surface, and the dashboard 60. The operation bar 2 is supported by the center stay 67 in the slidingly displaceable manner from the driver's seat 76 side, and the center stay 67 is the vehicle body strengthening member that connects the instrument panel member 66 and the floor tunnel 62.

With the above configuration, the operation bar 2 is supported by the center stay 67 as the vehicle body strengthening member, and thus can firmly be supported to the vehicle body.

Furthermore, since the center stay 67 is the existing vehicle body strengthening member that is originally assembled to the vehicle body, it is possible to improve the assemblability of the driver assistance system 1 to the mass-production vehicle by using such a center stay 67 to support the operation bar 2 to the vehicle body.

Figure 9:
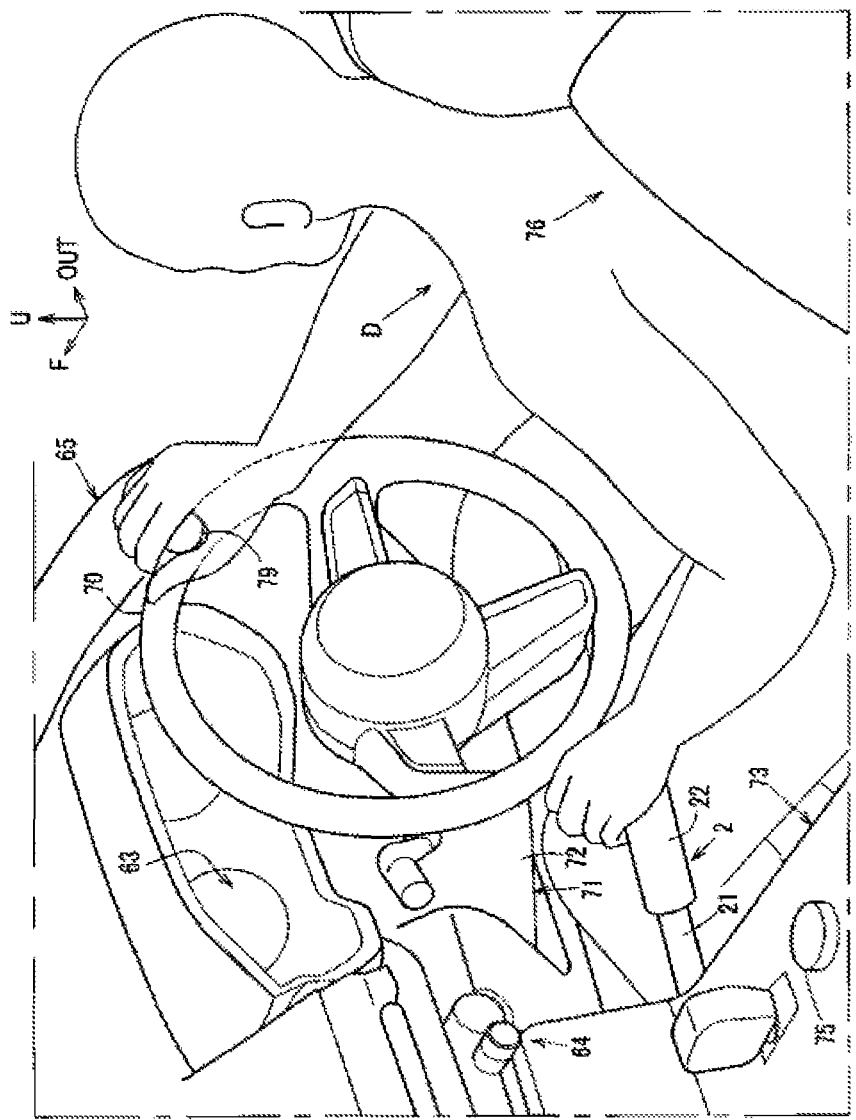
FIG. 9 is an external appearance view illustrating a situation where the vehicle in FIG. 1 is driven while a steering operation assistance tool provided to a steering wheel is held.

The present disclosure is not limited to the configuration in the above-described embodiment, but can be implemented in various embodiments. For example, as illustrated in FIG. 9, a configuration may be adopted wherein a steering operation assistance tool 79 for assisting with the steering operation by one hand (a right hand only) is attached to the steering wheel 70 of the base vehicle.

In the configuration where the operation bar 2 of the driver assistance system 1 is provided near and on the left side the driver's seat as in this embodiment, the driver D performs the brake/accelerator operation while holding the operation bar 2 by his/her left hand. Accordingly, by attaching the steering operation assistance tool 79 to the right side of the steering wheel 70, the steering operation is performed while the steering operation assistance tool 79 is held by one hand (the right hand only). As a result, it is possible to easily perform the steering operation only by one hand.

What is claimed is:

1. A driver assistance system including an operation bar which extends in a down direction toward a floor surface from a manual operation area where a driver who is seated on a driver's seat can manually operate the operation bar, and whose portion below said manual operation area is supported by a vehicle body, wherein
the operation bar has a tilted posture in a front-down rear-up state and is supported by the vehicle body in a slidingly displaceable manner along an axial direction of said operation bar, and includes:

in an area at least below the manual operation area, a brake actuation section that actuates a brake mechanism by the sliding displacement in a front down direction of the operation bar; and an accelerator actuation section that actuates an acceleration mechanism by sliding displacement of the operation bar in a rear up direction that is a reverse direction on the same axis from the sliding displacement in the front down direction; wherein an instrument panel member as a vehicle body strengthening member extending in a vehicle width direction is disposed behind a dashboard that separates an engine compartment and a cabin, a floor tunnel as a vehicle body strengthening member extending in a vehicle front-rear direction is disposed in central portions in the vehicle width direction of a floor panel, which forms the vehicle body floor surface, and the dashboard, and the operation bar is supported by a center stay in the slidingly displaceable manner from the driver's seat side, the center stay being a vehicle body strengthening member that connects the instrument panel member and the floor tunnel.

2. The driver assistance system according to claim 1, wherein the brake actuation section has a link mechanism that is interposed between a lower portion of the operation bar and a brake pedal and that transmits, to the brake pedal, an operation amount generated by the sliding displacement in the front down direction.

3. The driver assistance system according to claim 2, wherein the operation bar can slidingly be displaced in the front down direction or the rear up direction from a neutral position at which the operation bar is located in a state where an operating force is not applied to said operation bar, and each of the brake actuation section and the accelerator actuation section includes urging means that urges the operation bar to the neutral position.

4. The driver assistance system according to claim 2, wherein the accelerator actuation section has an accelerator-by-wire mechanism including: a sensor that detects the operation amount generated by the sliding displacement in the rear up direction of the operation bar; and a wire member that transmits the sliding displacement amount in the rear up direction from the operation bar to the sensor.

5. The driver assistance system according to claim 4, wherein the operation bar can slidingly be displaced in the front down direction or the rear up direction from a neutral position at which the operation bar is located in a state where an operating force is not applied to said operation bar, and each of the brake actuation section and the accelerator actuation section includes urging means that urges the operation bar to the neutral position.

6. The driver assistance system according to claim 1, wherein the accelerator actuation section has an accelerator-by-wire mechanism including: a sensor that detects the operation amount generated by the sliding displacement in the rear up direction of the operation bar; and a wire member that transmits the sliding displacement amount in the rear up direction from the operation bar to the sensor.

7. The driver assistance system according to claim 6, wherein the operation bar can slidingly be displaced in the front down direction or the rear up direction from a neutral position at which the operation bar is located in a state where an operating force is not applied to said operation bar, and each of the brake actuation section and the accelerator actuation section includes urging means that urges the operation bar to the neutral position.

8. The driver assistance system according to claim 1, wherein the operation bar can slidingly be displaced in the front down direction or the rear up direction from a neutral position at which the operation bar is located in a state where an operating force is not applied to said operation bar, and each of the brake actuation section and the accelerator actuation section includes urging means that urges the operation bar to the neutral position.

9. A driver assistance system including an operation bar which extends in a down direction toward a floor surface from a manual operation area where a driver who is seated on a driver's seat can manually operate the operation bar, and whose portion below said manual operation area is supported by a vehicle body, wherein the operation bar has a tilted posture in a front-down rear-up state and is supported by the vehicle body in a slidingly displaceable manner along an axial direction of said operation bar, and includes:

in an area at least below the manual operation area, a brake actuation section that actuates a brake mechanism by the sliding displacement in a front down direction of the operation bar; and an accelerator actuation section that actuates an acceleration mechanism by sliding displacement of the operation bar in a rear up direction that is a reverse direction on the same axis from the sliding displacement in the front down direction; wherein the brake actuation section has a link mechanism that is interposed between a lower portion of the operation bar and a brake pedal and that transmits, to the brake pedal, an operation amount generated by the sliding displacement in the front down direction;

the brake pedal includes a lever section extending in an up-down direction and a pedal section disposed at a lower end portion of the lever section; and the link mechanism includes a pedal pressing piece which engages and presses the lever section.

* * * * *